United States Patent
Pagaime da Silva et al.

(10) Patent No.: US 10,802,671 B2
(45) Date of Patent: Oct. 13, 2020

(54) CONTEXTUAL INFORMATION FOR A DISPLAYED RESOURCE THAT INCLUDES AN IMAGE

(71) Applicant: Google Inc., Mountain View, CA (US)

(72) Inventors: Joao Paulo Pagaime da Silva, Adliswil (CH); Vikram Aggarwal, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 915 days.

(21) Appl. No.: 15/206,593

(22) Filed: Jul. 11, 2016

(65) Prior Publication Data

US 2018/0011611 A1    Jan. 11, 2018

(51) Int. Cl.
*G06F 3/0482* (2013.01)
*G06F 16/9535* (2019.01)
*G06F 16/2457* (2019.01)
*G06F 16/951* (2019.01)
*G06F 16/248* (2019.01)
*H04L 29/06* (2006.01)
*H04W 88/02* (2009.01)

(52) U.S. Cl.
CPC .......... *G06F 3/0482* (2013.01); *G06F 16/248* (2019.01); *G06F 16/24575* (2019.01); *G06F 16/951* (2019.01); *G06F 16/9535* (2019.01); *H04L 67/42* (2013.01); *H04W 88/02* (2013.01)

(58) Field of Classification Search
CPC .............. G06F 3/0482; G06F 16/9535; G06F 16/24575; G06F 16/951; G06F 16/248; G06F 16/2457; G06F 16/12; H04L 67/42; H04W 88/02
See application file for complete search history.

(56) References Cited

U.S. PATENT DOCUMENTS 6,763,496 B1 * 7/2004 Hennings .............. G06F 16/957
                                                    715/205
7,389,181 B2    6/2008 Meadow
(Continued)

OTHER PUBLICATIONS

U.S. Appl. No. 13/069,978, filed Mar. 23, 2011, Taubman et al.
(Continued)

*Primary Examiner* — Aleksandr Kerzhner
*Assistant Examiner* — Maher N Algibhah
(74) *Attorney, Agent, or Firm* — Middleton Reutlinger

(57) ABSTRACT

Methods, systems, and apparatus, including computer programs encoded on a computer storage medium, for providing contextual information for a displayed resource that includes an image. In one aspect, a method includes providing, by a user device to a contextual information server, a query-independent request for contextual information relevant to an active resource displayed in an application environment on the user device, wherein the request specifies content of the active resource and further specifies that the active resource displayed on the user device includes an image, but does not include the image in the request, receiving a request for the image from the contextual information server, providing the image to the contextual information server, receiving a user interface element that includes contextual information regarding the image, and displaying the user interface element on the user device with the active resource.

20 Claims, 7 Drawing Sheets

(56) References Cited

U.S. PATENT DOCUMENTS

| | | | |
|---|---|---|---|
| 7,593,868 B2* | 9/2009 | Margiloff | G06Q 30/02 |
| | | | 705/14.25 |
| 7,689,613 B2 | 3/2010 | Candelore | |
| 7,774,333 B2* | 8/2010 | Colledge | G06Q 30/0251 |
| | | | 707/708 |
| 7,788,266 B2 | 8/2010 | Venkataraman | |
| 7,877,382 B1* | 1/2011 | Sercinoglu | G06F 16/9535 |
| | | | 707/723 |
| 8,234,168 B1* | 7/2012 | Lagle Ruiz | G06Q 30/0267 |
| | | | 705/14.64 |
| 8,255,495 B1* | 8/2012 | Lee | G06Q 30/00 |
| | | | 709/219 |
| 8,316,019 B1 | 11/2012 | Ainslie et al. | |
| 8,321,406 B2 | 11/2012 | Garg et al. | |
| 8,391,618 B1 | 3/2013 | Chuang | |
| 8,392,435 B1 | 3/2013 | Yamauchi | |
| 8,515,185 B2 | 8/2013 | Lee | |
| 8,521,764 B2 | 8/2013 | Pfleger | |
| 8,606,781 B2 | 12/2013 | Chi et al. | |
| 8,898,095 B2 | 11/2014 | Agrawal | |
| 9,047,654 B2* | 6/2015 | Vanhoucke | G06Q 30/02 |
| 9,245,182 B2* | 1/2016 | Jania | G06K 9/00469 |
| 9,535,881 B1* | 1/2017 | Root | G06F 17/212 |
| 10,078,707 B2* | 9/2018 | Lee | G06Q 30/00 |
| 10,210,554 B2* | 2/2019 | Linevsky | G06Q 30/0277 |
| 2001/0053968 A1 | 12/2001 | Galitsky | |
| 2004/0243936 A1* | 12/2004 | Fukuda | G06F 16/9535 |
| | | | 715/249 |
| 2007/0060114 A1 | 3/2007 | Ramer et al. | |
| 2007/0071320 A1 | 3/2007 | Yada | |
| 2007/0140595 A1 | 6/2007 | Taylor | |
| 2007/0214131 A1 | 9/2007 | Cucerzan | |
| 2008/0046405 A1 | 2/2008 | Olds et al. | |
| 2008/0109511 A1* | 5/2008 | Tang | G06F 21/10 |
| | | | 709/203 |
| 2008/0189110 A1* | 8/2008 | Freeman | G06Q 30/0241 |
| | | | 704/251 |
| 2008/0270110 A1 | 10/2008 | Yurick | |
| 2010/0306249 A1 | 12/2010 | Hill | |
| 2011/0035406 A1 | 2/2011 | Petrou et al. | |
| 2011/0038512 A1 | 2/2011 | Petrou et al. | |
| 2011/0125735 A1 | 5/2011 | Petrou | |
| 2011/0128288 A1 | 6/2011 | Petrou et al. | |
| 2011/0131241 A1 | 6/2011 | Petrou et al. | |
| 2011/0137895 A1 | 6/2011 | Petrou et al. | |
| 2012/0109858 A1 | 5/2012 | Makadia et al. | |
| 2012/0176509 A1 | 7/2012 | Aravamudan et al. | |
| 2012/0191745 A1 | 7/2012 | Velipasaoglu et al. | |
| 2012/0215533 A1 | 8/2012 | Aravamudan et al. | |
| 2012/0233143 A1* | 9/2012 | Everingham | G06F 16/9032 |
| | | | 707/706 |
| 2013/0086112 A1* | 4/2013 | Everingham | G06Q 30/0641 |
| | | | 707/780 |
| 2013/0132361 A1 | 5/2013 | Chen et al. | |
| 2013/0346400 A1 | 12/2013 | Ramsey et al. | |
| 2014/0046935 A1 | 2/2014 | Bengio et al. | |
| 2014/0108911 A1* | 4/2014 | Damale | H04L 67/22 |
| | | | 715/234 |
| 2014/0172881 A1 | 6/2014 | Petrou et al. | |
| 2015/0045003 A1* | 2/2015 | Vora | H04M 1/64 |
| | | | 455/412.2 |
| 2015/0058318 A1 | 2/2015 | Blackwell | |
| 2015/0161160 A1* | 6/2015 | Chen | G06F 9/454 |
| | | | 707/639 |
| 2015/0193863 A1* | 7/2015 | Cao | G06F 16/51 |
| | | | 705/27.2 |
| 2015/0264299 A1* | 9/2015 | Leech | H04N 21/6587 |
| | | | 348/78 |
| 2016/0171530 A1* | 6/2016 | Sa | G06Q 30/0251 |
| | | | 705/14.49 |
| 2017/0004383 A1* | 1/2017 | Lin | G06F 16/5866 |
| 2017/0270506 A1* | 9/2017 | Zhou | G06F 3/017 |

OTHER PUBLICATIONS

U.S. Appl. No. 13/906,889, filed May 31, 2013, Heiler et al.
U.S. Appl. No. 14/313,519, filed Jun. 24, 2014, Bakir et al.
"10 Mobile Astronomy Apps for Stargazers," [online][Retrieved on Apr. 29, 2014]; Retrieved from the Internet URL: http://mashable.com/2011/06/21/astronomy-mobile-apps/, 2011, 13 pages.
"Google announces Search by Image and Voice Search for desktop, revamped mobile search," [online] Jun. 14, 2011 [Retrieved on Mar. 22, 2017] Retrieved from the Internet URL: https://www.engadget.com/2011/06/14/google-announces-search-by-image-search-by-voice-for-desktop/> 1 page.
"Google's Impressive "Conversational Search" Goes Live on Chrome," [online][Retrieved on May 5, 2014]; Retrieved from the Internet URL: http://searchengineland.com/googles-impressive-conversational-search-goes-line-on-chrome-160445, 2013, 12 pages.
Zhang et al., "Probabilistic Query Rewriting for Efficient and Effective Keyword Search on Graph Data," Proceedings of the VLDB Endowment 6(14):1642-1653, 2013, 12 pages.
International Search Report and Written Opinion issued in International Application No. PCT/US2017/040220, dated Sep. 21, 2017, 15 pages.
Omhover et al. "Combining text and image retrieval," Eurofuse workshop on Data, Jan. 1, 2004, 9 pages.
Kim et al. "A Context-Aware based Dynamic User Preference Profile Construction Method," International Journal of Advanced Engineering and Global Technology, Nov. 1, 2013, 7 pages.
Yeh et al. "A case for query by image and text content," World Wide Web, ACM, Mar. 28, 2011, 10 pages.
European Patent Office; Communication issued for Application No. 17740537.0 dated Jul. 17, 2020.

* cited by examiner

CONTEXTUAL INFORMATION FOR A DISPLAYED RESOURCE THAT INCLUDES AN IMAGE

BACKGROUND

This specification relates to providing contextual information to a user.

A device may provide a user with contextual information for a displayed resource that includes an image. For example, a device may display a web page about a particular subject, receive a search query from the user regarding the particular subject, and retrieve search results responsive to the search query, and provide the search results to the user. Typical interaction models require users to provide some form of a user query to a user device. For example, a user may save an image from the web page and then upload the image as a query image. A search process then executes a search of resources using the query image to identify resources that may satisfy the user's informational needs.

SUMMARY

In general, one innovative aspect of the subject matter described in this specification can be embodied in methods that include the actions of providing, by a user device to a contextual information server, a query-independent request for contextual information relevant to an active resource displayed in an application environment on the user device, where the request specifies content of the active resource and further specifies that the active resource displayed on the user device includes an image, but does not include the image in the request, receiving, by the user device, a request for the image from the contextual information server, in response to receiving the request for the image from the contextual information server, providing, by the user device, the image to the contextual information server, receiving, by the user device, a user interface element that includes contextual information regarding the image, and displaying, by the user device, the user interface element on the user device with the active resource.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, providing, by a user device to a contextual information server, a query-independent request for contextual information relevant to an active resource displayed in an application environment on the user device, where the request specifies content of the active resource and further specifies that the active resource displayed on the user device includes an image, but does not include the image in the request includes providing a query-independent request that does not include one or more query terms entered by a user and does not include any content from the image. In certain aspects, providing, by a user device to a contextual information server, a query-independent request for contextual information relevant to an active resource displayed in an application environment on the user device, where the request specifies content of the active resource and further specifies that the active resource displayed on the user device includes an image, but does not include the image in the request includes providing a query-independent request that includes a data representation of the active resource displayed and does not include any content from the image.

In some aspects, receiving, by the user device, a request for the image from the contextual information server includes receiving, by the user device, a request for all images currently displayed on the user device, and providing, by the user device, the image to the contextual information server includes providing, by the user device, all images currently being displayed on the user device to the contextual information server. In some implementations, in response to receiving the request for the image from the contextual information server, providing, by the user device, the image to the contextual information server includes providing a screenshot from the user device when multiple images are being displayed on the user device. In certain aspects, actions include determining that a user desires contextual information relevant to the active resource and in response to determining that the user desires contextual information relevant to the active resource, determining whether one or more images are currently being displayed, where providing, by the user device to the contextual information server, the query-independent request for contextual information relevant to the active resource displayed in the application environment on the user device is in response to determining that one or more images are currently being displayed.

In some implementations, determining whether one or more images are currently being displayed includes obtaining a screenshot from the user device and identifying one or more rectangular portions of the screenshot that include non-textual content as the one or more images. In certain aspects, determining whether one or more images are currently being displayed is further in response to determining, by the user device, that the user device is using a metered network connection.

In general, one innovative aspect of the subject matter described in this specification can be embodied in methods that include the actions of receiving, by a contextual information server from a user device, a query-independent request for contextual information relevant to an active resource displayed in an application environment on the user device, where the request specifies content of the active resource and further specifies that the active resource displayed on the user device includes an image, but does not include the image in the request, determining, by the contextual information server, that the content specified by the request is insufficient to provide contextual information regarding the active resource, in response to determining that the content specified by the request is insufficient to provide contextual information regarding the active resource, providing, by the contextual information server to the user device, a request for the image in the active resource, receiving, by the contextual information server from the user device, the image in the active resource, and providing, by the contextual information server to the user device, a user interface element that includes contextual information regarding the image.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The foregoing and other embodiments can each optionally include one or more of the following features, alone or in combination. In some implementations, determining, by the contextual information server, that the content specified by the request is insufficient to provide contextual information regarding the active resource includes determining that the request specifies that the active resource displayed on the user device includes an image but does not include the image in the request, where providing, by the contextual information server to the user device, the request for the image in the active resource is in response to determining that the request specifies that the active resource displayed on the user device includes an image but does not include the image in the request. In certain aspects, determining, by the contextual information server, that the content specified by the request is insufficient to provide contextual information regarding the active resource includes identifying one or more search items from the content specified by the request and determining not to select any of the one or more search items to provide contextual information regarding the search item. In some aspects, receiving, by a contextual information server from a user device, a query-independent request for contextual information relevant to an active resource displayed in an application environment on the user device includes receiving a query-independent request that does not include one or more query terms entered by a user and does not include any content from the image.

Particular embodiments of the subject matter described in this specification can be implemented so as to realize one or more of the following advantages. Contextual information that is likely to satisfy a user's informational need when viewing a resource that includes an image may be provided by a device to a user without the user providing a query to the device. This results in a convenient way for the user to obtain contextual information for a displayed resource. The user no longer needs to input terms for a query to obtain contextual information, or save an image in a displayed resource and then upload the saved image to obtain contextual information. Accordingly, users receive contextual information in a manner that is convenient for the user. Also, because the user need not provide a query, the user may, in some implementations, receive contextual information when the user would otherwise be unable to type or a query effectively, e.g., when the user only has one hand free.

Because the contextual information can be provided without a query, this results in fewer input errors and erroneously input queries. Accordingly, when considered in the aggregate, thousands of erroneous and inaccurate queries are avoided, which in turn, provides a more efficient use of search system resources. In other words, multiple erroneous query processing cycles are avoided, which reduces processing resources required and reduces overall system bandwidth requirements (or, alternatively, enables a larger number of users to be serviced without a commensurate increase in processing resources). This improvement in the technological field of search processing is thus another distinct advantage realized by the systems and methods described below.

Additionally, the device used by the user may first provide textual content of the displayed resource to a server and if the server is unable to provide contextual information based on the textual content of the displayed resource, then provide image content of the displayed resource so that the server can attempt to identify contextual information using the image content. In this manner the device may limit providing images that may have large file sizes to those cases in which textual content for a displayed resource is insufficient to provide contextual information. Accordingly, a user can obtain contextual information for a displayed resource in a way that reduces bandwidth usage and power usage of the device when possible. This improvement in the technological field of search processing is thus another distinct advantage realized by the systems and methods described below.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A user may desire to receive additional information regarding a resource displayed on a device that includes an image. For example, a user may be browsing a webpage that includes a logo of "Paul's Diner" and may desire to obtain additional information about "Paul's Diner." Accordingly, the user may save the logo, open a web page for a search engine, provide the logo as a query image to the search engine, and then select a search result to view. However, this process may be time consuming and require multiple interactions by the user. Additionally, the logo may have a large file size and the user may have been able to obtain contextual information using less bandwidth and power. For example, a search query including the terms "Paul's Diner" may be represented by only a few bytes of data instead of megabytes of data needed to represent the logo of "Paul's Diner," needed less bandwidth and power to transmit the fewer bytes representing the terms "Paul's Diner," and may have resulted in similar search results.

Described below are systems and methods for providing contextual information for a displayed resource that includes an image. Instead of providing contextual information based on a query entered by a user, the system may provide contextual information relevant to a displayed resource including an image without receiving a query input. Additionally, the system may initially attempt to provide contextual information without transmitting the image in the displayed resource and then transmit the image if contextual information cannot be provided for the displayed resource without the image.

To provide the contextual information, a device used by a user may determine that a displayed resource includes an image and provide a server textual non-image content of the displayed resource and an indication that the displayed resource includes an image. If the server identifies contextual information to provide from the textual non-image content of the displayed resource, the server can provide the contextual information to the device and the image from the displayed resource is not provided by the device to the server. If the server does not identify contextual information to provide from the textual non-image content of the displayed resource, the server requests the image in the displayed resource from the device and attempts to provide contextual information from the received image.

Figure 1:
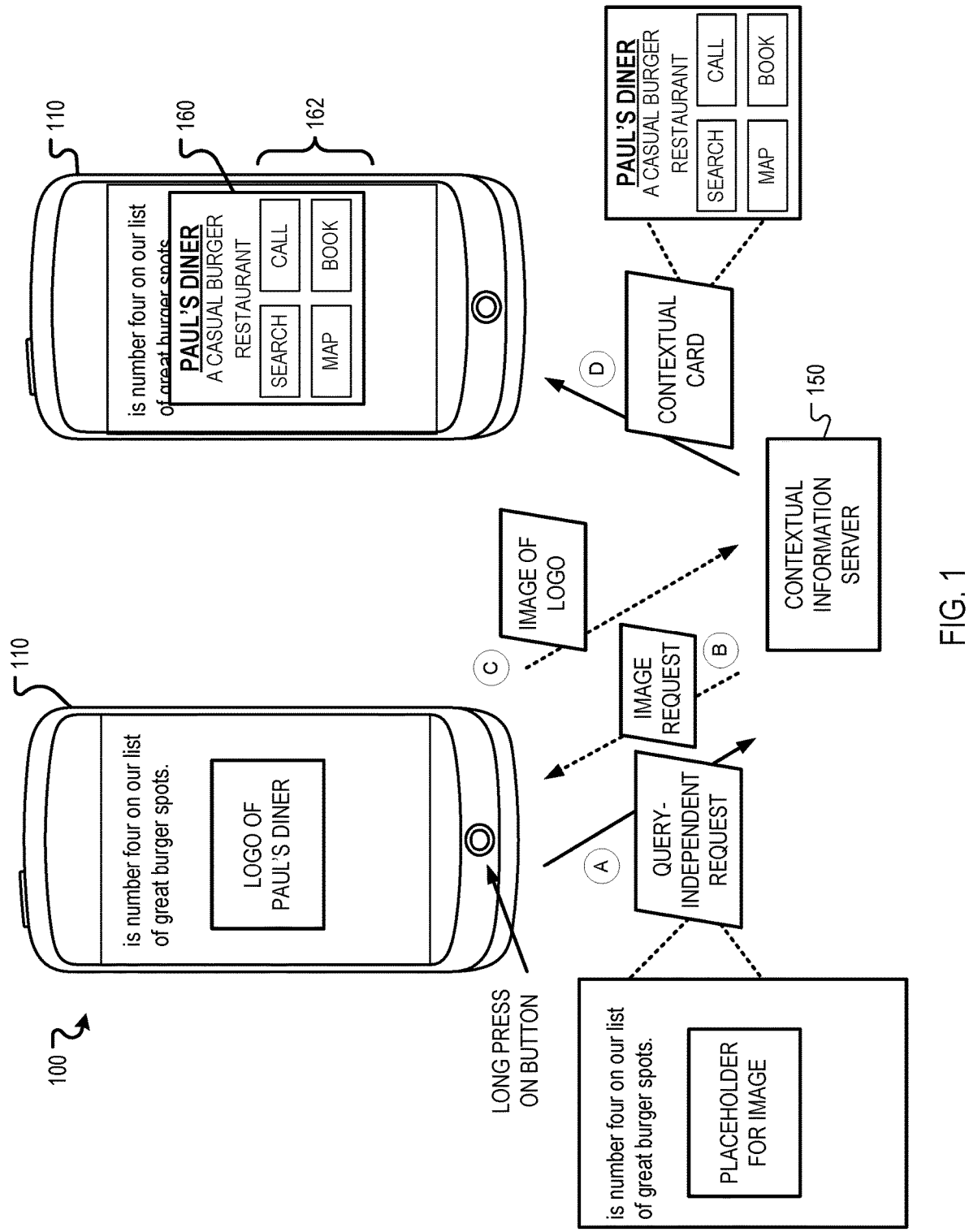
FIG. 1 is a block diagram of an example environment in which contextual information is provided for a displayed resource that includes an image.

FIG. 1 is a block diagram of an example environment 100 in which contextual information is provided for a displayed resource that includes an image. The environment 100 includes a user device 110 and a contextual information server 150.

A user device 110 is used by a user to obtain contextual information for a displayed resource that includes an image. The user device 110 is an electronic device that is capable of displaying resources that include images. Example user devices 110 include personal computers (e.g., desktops or laptops), mobile communication devices (e.g., smart phones or tablets), and other devices that can send and receive data over the network (e.g., televisions, and glasses or watches with network communication functionality). A user device typically includes a user application, e.g., a web browser, to facilitate the sending and receiving of data over the network. The web browser can enable a user to display and interact with text, images, videos, music and other information typically located on a web page at a website on the World Wide Web or a local area network. The user device 110 may use any appropriate application to send and receive data over the network and present data to a user.

A resource is data that includes content that can be visibly rendered by the user device 110. For example, resources may include HTML pages, electronic documents, images files, video files, text message conversations, e-mails, graphical user interfaces of applications, etc. An active resource may be considered a resource that is currently being displayed on the user device 110. Typically, the active resource is rendered by an application that is running in a foreground of a user device.

The user device 110 detects that a user desires contextual information for a displayed resource. For example, the user device 110 may be displaying a resource hosted by a website, where the resource describes restaurants that serve good burgers and a portion of the resource including the text "is number four on our list of great burger spots" and including an image of a logo of the restaurant "Paul's Diner" is currently being displayed. The user may generate an indication for contextual information, e.g., by pressing a button for three seconds (referred to as a long press) or tapping the screen according to a predefined tap pattern, etc. Assume for illustrative purposes the user performs a long press that indicates that the user desires contextual information for a displayed resource.

In response to detecting that a user desires contextual information for a displayed resource, the user device 110 may determine whether the displayed resource includes one or more images. For example, the user device 110 may determine that a displayed resource includes an image, e.g., a logo of "Paul's Diner," in a center of the display.

In response to determining that the displayed resource includes one or more images, the user device 110 may provide a request to the contextual information server 150 for contextual information for the displayed resource where the request specifies displayed textual content and an indication that one or more images are being displayed, but the request does not include any images. For example, the user device 110 may provide the contextual information server 150 a document object model that specifies the textual content "is number four on our list of great burger spots" is currently being displayed on the user device 110 and indicates a placeholder for the displayed image, e.g., the logo of "Paul's Diner." The request may be considered a query-independent request as the user device 110 provides the request to the contextual information server 150 without having the user enter terms for a query or specify an image for a query, as indicated by flow element A.

In response to providing a request to the contextual information server 150 for contextual information for the displayed resource where the request includes displayed textual content and an indication that one or more images are being displayed, but does not include any images, the contextual information server 150 may determine whether the contextual information server 150 can provide a contextual card from the content of the displayed resource specified in the request. For example, the contextual information server 150 may determine whether the textual content "is number four on our list of great burger spots" specified by the request is sufficient to provide contextual information.

If the contextual information server 150 determines that the specified content is not sufficient to provide a contextual card, the contextual information server 150 may provide an image request to the user device 110 for any images in the displayed resource, as indicated by flow element B. The user device 110 may receive the image request and, in response, provide any displayed images to the contextual information server 150. For example, the user device 110 may receive the image request and, in response, provide the displayed logo of "Paul's Diner" included in the resource, as indicated by flow element C.

The contextual information server 150 may receive any images provided by the user device 110 and provide contextual information identified from the images. For example, the contextual information server 150 may receive an image that is a logo of "Paul's Diner," determine that the image is a logo of "Paul's Diner," and, in response, provide contextual information about "Paul's Diner" in a user interface element, as indicated by flow element D.

The user device 110 then receives one or more user interface elements from the contextual information server 150. For example, the user device 110 may receive a user interface element for "Paul's Diner" from the contextual information server 150. For the purposes of illustration, the user interface elements are described as cards. However, other user interface elements may be used, for example, chat bubbles, selectable linked notes or footnotes, synthesized voice responses, or other forms. A contextual card may be data that includes contextual information about a search item. For example, a contextual card for "Paul's Diner" may include contextual information that describes that "Paul's Diner" is "A casual burger restaurant." The contextual card may indicate next actions. For example, the contextual card for "Paul's Diner" may include selectable options for performing searches for web pages about "Paul's Diner," opening a map centered on an address of "Paul's Diner," calling a phone number for "Paul' Diner," and booking a reservation at "Paul's Diner."

The user device 110 provides the received contextual cards to the user. For example, the user device 110 may provide the contextual cards by generating a graphical panel 160 that is shown overlaid on top of the displayed resource. The graphical panel 160 identifies that the graphical panel is for the item "Paul's Diner" and that Paul's Diner is "A casual burger restaurant" and includes selectable options 162 for performing searches for web pages about "Paul's Diner," opening a map centered on an address of "Paul's Diner," calling a phone number for "Paul' Diner," and booking a reservation at "Paul's Diner." In another example, the user device 110 may stop displaying the resource and instead display the graphical panel 160.

The user device 110 may enable the user to quickly return to the displayed resource. For example, the user device 110 may stop displaying the graphical panel 160 in response to detecting that a user has interacted with, e.g., clicked or touched, a portion of the resource that is not overlaid by the graphical panel 160. In another example, the user device 110 may stop displaying the graphical panel 160 and display the resource in response to detecting that a user has interacted with, e.g., clicked or touched, a selectable option for closing the graphical panel 160.

In some implementations, in response to detecting that a user desires contextual information for a displayed resource, the user device 110 may determine whether the user device 110 is in a mode in which providing displayed images only when displayed textual content is insufficient to provide contextual information is desirable. For example, the user device 110 may determine whether the user device 110 is on a metered network connection, e.g., a cellular connection instead of a Wi-Fi connection, where limiting bandwidth usage is desirable or the user device 110 may determine whether the user device 110 is low on power so limiting power usage caused by data transmission is desirable. In response to determining that the user device 110 is in a mode in which providing displayed images only when displayed textual content is insufficient to provide contextual information is desirable, the user device 110 may then determine whether the displayed resource includes an image, as described above. In response to determining that the user device 110 is not in a mode in which providing displayed images only when displayed textual content is insufficient to provide contextual information is desirable, the user device 110 may include any images in the initial request or include a screenshot from the user device 110 in the initial request.

In some implementations, in response to detecting that a user desires contextual information for a displayed resource, the user device 110 may determine whether the user device 110 has a network connection. If the user device 110 determines the user device 110 does not have a network connection, the user device 110 may crop displayed images and one or more of perform local searches used the cropped images or save the cropped images and wait until the user device 110 has a network connection to use the saved images as query images.

Figure 2:
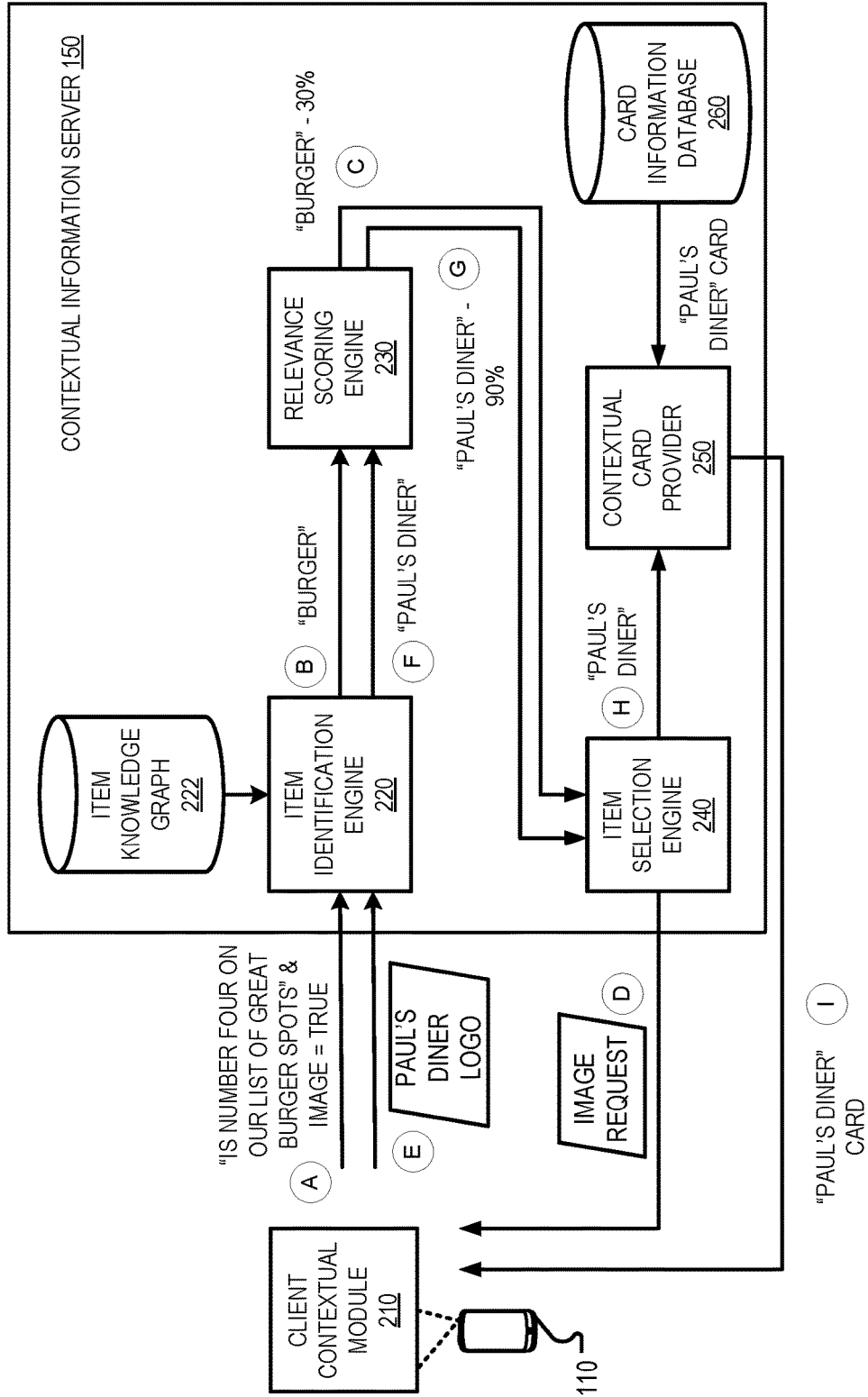
FIG. 2 is a more detailed block diagram of the example environment in which contextual information is provided for a displayed resource that includes an image.

FIG. 2 is a more detailed block diagram of the example environment 100 in which contextual information is provided for a displayed resource that includes an image. The environment 100 includes a client contextual module 210 on a user device and the contextual information server 150. The contextual information server 150 includes an item identification engine 220, an item knowledge graph 222, a relevance scoring engine 230, an item selection engine 240, a contextual card provider 250, and a card information database 260. In some implementations, the client contextual module 210 may be provided on the user device 110 shown in FIG. 1. In other implementations, the client contextual module 210 may be provided on another user device different than the user device 110 shown in FIG. 1.

The client contextual module 210 determines that a user desires contextual information for a displayed resource that includes an image. For example, the client contextual module 210 may determine that a user has rapidly pressed a button three times when viewing a resource with the text "is number four on our list of great burger spots" and includes a logo of "Paul's Diner" (in this example, rapidly pressing the button three times indicates that the user desires contextual information but other interactions may be used to indicate that desire).

In response to determining that a user desires contextual information for a displayed resource, the client contextual module 210 determines whether any images are being displayed and generates a request to the contextual information server 212 for contextual information for the displayed resource, where the request specifies textual content of the displayed resource and whether the displayed resource includes any images, but does not include the actual images. For example, the client contextual module 210 may determine that an image is displayed in the center of the screen and generate a request that specifies that the text "is number four on our list of great burger spots" is being displayed and that at least one image is being displayed.

The client contextual module 210 may determine whether the displayed resource includes at least one image based on taking a screenshot and identifying rectangular areas in the screenshot that include non-textual content. For example, the client contextual module 210 may analyze contrast of adjacent pixels in a screenshot to identify rectangular areas that include non-textual content. Additionally or alternatively, the client contextual module 210 may determine whether the displayed resource includes one or more images based on a document object model that represents what is currently being displayed on the user device 110. For example, the user device 110 may determine that Hypertext Markup Language (HTML) of a displayed webpage specifies the display of an image.

In some implementations, the client contextual module 210 may only consider images that satisfy an image criteria. For example, the client contextual module 210 may ignore images that are less than one hundred, two hundred, five hundred pixels, or some other number of pixels in area so if images are displayed but no image includes at least that number of pixels in area, the client contextual module 210 may indicate that no images are displayed.

In response to determining that the displayed resource includes at least one image, the user device 110 generates a request that specifies the textual content of the displayed resource and an indication that at least one image is included in the displayed resource, but does not include any images from the displayed resource. For example, the client contextual model 210 may generate a request that includes the text "is number four on our list of great burger spots" and includes "Image=True" that indicates that an image is being displayed, but does not include an image of the logo for "Paul's Diner."

The client contextual module 210 then provides the request to the item identification engine 220. For example, the client contextual module 210 provides the request to the item identification engine 220 without the user providing any query terms or specifying a query image. This request is indicated by flow element A.

The item identification engine 220 receives the request for contextual information for the displayed resource and attempts to identify one or more search items from content specified by the request. For example, the item identification engine 220 may obtain a request that specifies the text "is number four on our list of great burger spots" and indicates that an image is displayed and, in response, identifies the search item "Burgers" from the text specified by the request.

As used in this specification, a "search item" is a concept or thing that can be used by a search system to conduct a search of information. A search item may be referred to by a text fragment, e.g., a term or phrase, and search items are distinguishable from one another, e.g., based on context. For example, a search item may be a keyword, and instance of a particular entity, a proper name, an entity or relation modeled by a node or an edge in a knowledge graph, and the like.

The item identification engine 220 may identify search items by extracting text from the request. For example, the item identification engine 220 may extract the text "is number four on our list of great burger spots" from the request. The item identification engine 220 may extract the text by parsing a document object model representing the displayed resource.

The item identification engine 220 may identify the one or more search items from the extracted text using the item knowledge graph 222. For example, the item identification engine 220 may identify that the text "burger" in the displayed resource matches the name of a food item "Burger" in the item knowledge graph 222. The item knowledge graph 222 may be a knowledge graph that includes nodes for search items, edges that indicate relationships between the nodes, and contextual information describing the search items represented by the nodes. In another example, the item identification engine 220 may identify the one or more search items from the extracted text by performing searches using the text. For example, the item identification engine 220 may determine that a search query including the term "burger" results in a definition of the term "burger."

While the initial request received from the client contextual module 210 does not include images, the item identification engine 220 is further able to identify search items from images. For example, the item identification engine 220 may identify labeled images that are visually similar to an image provided by the client contextual module 210, where the labeled images are labeled with identifiers for search items. In another example, the item identification engine 220 may perform optical character recognition on an image provided by the client contextual module 210 to extract text and then identify search items from the extracted text. However, as the initial request from the client contextual module 210 does not include images, the item identification engine 220 may not identify search items from images for the initial request for contextual information from the client contextual module 210.

The relevance scoring engine 230 may receive the search items identified by the item identification engine 220, as indicated by flow element B, and determine a relevance score for each of the search items. The relevance score can be determined in a variety of appropriate ways. For example, the relevance score may reflect a confidence that the search item is relevant to the user, i.e., a degree of confidence that the user would like to see contextual information about the search item. For example, the relevance scoring engine 230 may receive an indication that the search item "Burger" was identified from the textual content specified by a request, and determine a relevance score of 30% for the search item "Burger" indicating a low degree of confidence that the user would like to see contextual information about the search item "Burger."

The relevance scoring engine 230 may determine a relevance score for a search item based on an engagement of users with the search items. Examples of engagement include providing search queries for resources relevant to the search item, requesting a resource indexed as relevant to the search item, or some other significant signal of interest in the search item. The relevance scoring engine 230 may determine relevance scores indicating higher degrees of confidence that the user would like to see contextual information about a search item with greater engagement and may determine relevance scores indicating lower degrees of confidence that the user would like to see contextual information about a search item with lesser engagement. The relevance scoring engine 230 may determine the engagement for a search item from, for example, analyzing search query history logs or resource request logs.

Additionally or alternatively, the relevance scoring engine 230 may determine a relevance score for a search item based on an appearance of the text from which the search item was identified. For example, the relevance scoring engine 230 may determine relevance scores that reflect a higher degree of confidence for search items identified from text that is bolded as the text may be bolded because the text is important. In another example, the relevance scoring engine 230 may determine relevance scores that reflect a higher degree of confidence for search items identified from text that is a larger size, a different color, or aligned differently from the majority of text in the displayed resource because different appearance of the text may indicate that the text is important.

The item selection engine 240 may obtain the relevance scores and select one or more search items for which to provide contextual information to the user. For example, the item selection engine 240 may receive an identification of the search item "Burger" labeled with a relevance score of 30%, as indicated by flow element C and, in response, not select any search items to provide contextual information.

The item selection engine 240 may select the search items based on determining whether the search items have respective relevance scores that satisfy a relevance threshold. For example, the item selection engine 240 may not select the search item "Burger" as the relevance score of 30% is less than a relevance threshold of 60%, 65%, 85%, or some other percentage more than 30%. In another example, the item selection engine 240 may not select any search items as the item identification engine 220 may not identify any search items.

In response to selecting no search items identified from textual content specified by a request, the item selection engine 240 may determine whether the request indicates that the displayed resource includes at least one image. For example, the item selection engine 240 may determine whether the request includes a variable "Image" value a value of "True." In another example, the item selection engine 240 may determine whether the request includes a placeholder for an image.

In response to selecting no search items identified from textual content specified by a request and determining that the displayed includes at least one image, the item selection engine 240 may request images from the client contextual module 210. For example, the item selection engine 240 may provide an image request to the client contextual module 210 where the image request is an instruction to the client contextual module 210 to provide any images currently being displayed on the user device 110. This request is indicated by flow element D.

The client contextual module 210 may receive the image request and, in response, provide all images currently being displayed to the item identification engine 220. For example, the client contextual module 210 may receive the image request and, in response, provide the image that is a logo of "Paul's Diner." In some implementations in providing any images currently being displayed, the client contextual module 210 may determine whether multiple images are being displayed by the user device 110. For example, the client contextual module 210 may determine that a screenshot of the user device 110 includes multiple separate rectangular portions that include non-textual content. In response to determining that multiple images are being displayed, the client contextual module 210 may provide an entire screenshot of the user device 110. In response to determining that only a single is being displayed, the client contextual module 210 may provide a portion of a screenshot that corresponds to the rectangular portion that includes non-textual content, as indicated by flow element E.

The item identification engine 220 may receive the image and identify search items from the image. For example, the item identification engine 220 may receive an image that is a logo of "Paul's Diner" from the client contextual module 110, determine that received image is visually similar to an image that is labeled as a logo of "Paul's Diner" and, in response, identify "Paul's Diner" as a search item from the label. In another example, the item identification engine 220 may receive an image that is a logo of "Paul's Diner" from the client contextual module 110, perform optical character recognition on the image to extract the text "Paul's Diner" and, in response, identify "Paul's Diner" as a search item from the extracted text, as indicated by flow element F.

The relevance scoring engine 230 may receive the identification of any search items identified from images and, as described above, determine a relevance score for each of the search items. For example, the relevance scoring engine 230 may receive the identification of the search item "Paul's Diner," and, as described above, determine a relevance score of 90% for the search item "Paul's Diner" that indicates a high degree of confidence that the search item is relevant. In some implementations, the relevance scoring engine 230 may additionally take into consideration attributes of the image from which the search item is identified. For example, the relevance scoring engine 230 may additionally determine relevance scores that indicate a higher degree of confidence that a search item is relevant for images that have larger display areas and determine relevance scores that indicate a lower degree of confidence that a search item is relevant for images that have smaller display areas.

Additionally or alternatively, the relevance scoring engine 230 may combine textual content specified by the request with the received image to determine a relevance score. For example, the relevance scoring engine 230 may determine that the search item "Paul's Diner" is identified from the image that is a logo of "Paul's Diner," that the search item "Paul's Diner" has a description of "A casual burger restaurant" that includes the word "burger," that the request specifies the text "burger," and, in response, determine a relevance score that indicates a higher degree of confidence that the search item "Paul's Diner" is relevant for the displayed resource.

The item selection engine 240 may, as described above, obtain the relevance scores and select one or more search items for which to provide contextual information to the user. For example, the item selection engine 240 may obtain the relevance score of 90% for the search item "Paul's Diner," as indicated by flow element G and, in response, select the search item "Paul's Diner" to provide contextual information as the relevance score of 90% is above a threshold relevance score of 65%, 75%, 80%, or some other percentage less than 90%.

The contextual card provider 250 may obtain contextual cards including contextual information for the selected search items and provide the contextual cards to the client contextual module 210. For example, the contextual card provider 250 may obtain an identification of the search item "Paul's Diner" from the item selection engine 240, as indicated by flow element H, and provide a contextual card for the search item "Paul's Diner" to the client contextual module 210. In the example, the contextual card includes a full name and brief description for the search item "Paul's Diner" and selectable options for performing searches for web pages about "Paul's Diner," opening a map centered on an address of "Paul's Diner," calling a phone number for "Paul' Diner," and booking a reservation at "Paul's Diner."

The contextual card provider 250 may obtain contextual cards by generating contextual cards for search items. For example, the contextual card provider 250 may obtain, from the item knowledge graph 222, a full name, a brief description, a physical address, a phone number, and an indication that reservations may be booked for "Paul's Diner." In another example, the contextual card provider 250 may perform searches using the search item "Paul's Diner" to obtain a full name, a brief description, a physical address, a phone number, and an indication that reservations may be booked for "Paul's Diner."

In some implementations, before generating a contextual card for a search item, the contextual card provider 250 may determine whether a contextual card for the search item already exists in a card information database 260. For example, the contextual card provider 250 may query the card information database 260 for a contextual card for the search item "Paul's Diner." Where the card information database 260 includes an existing contextual card for the search item, the card information database 260 may provide the contextual card to the contextual card provider 250 so that the contextual card provider 250 can provide the existing contextual card to the client contextual module 210 instead of generating a new contextual card. The contextual card is then provided to the user device, as indicated by flow element I.

Figure 3A:
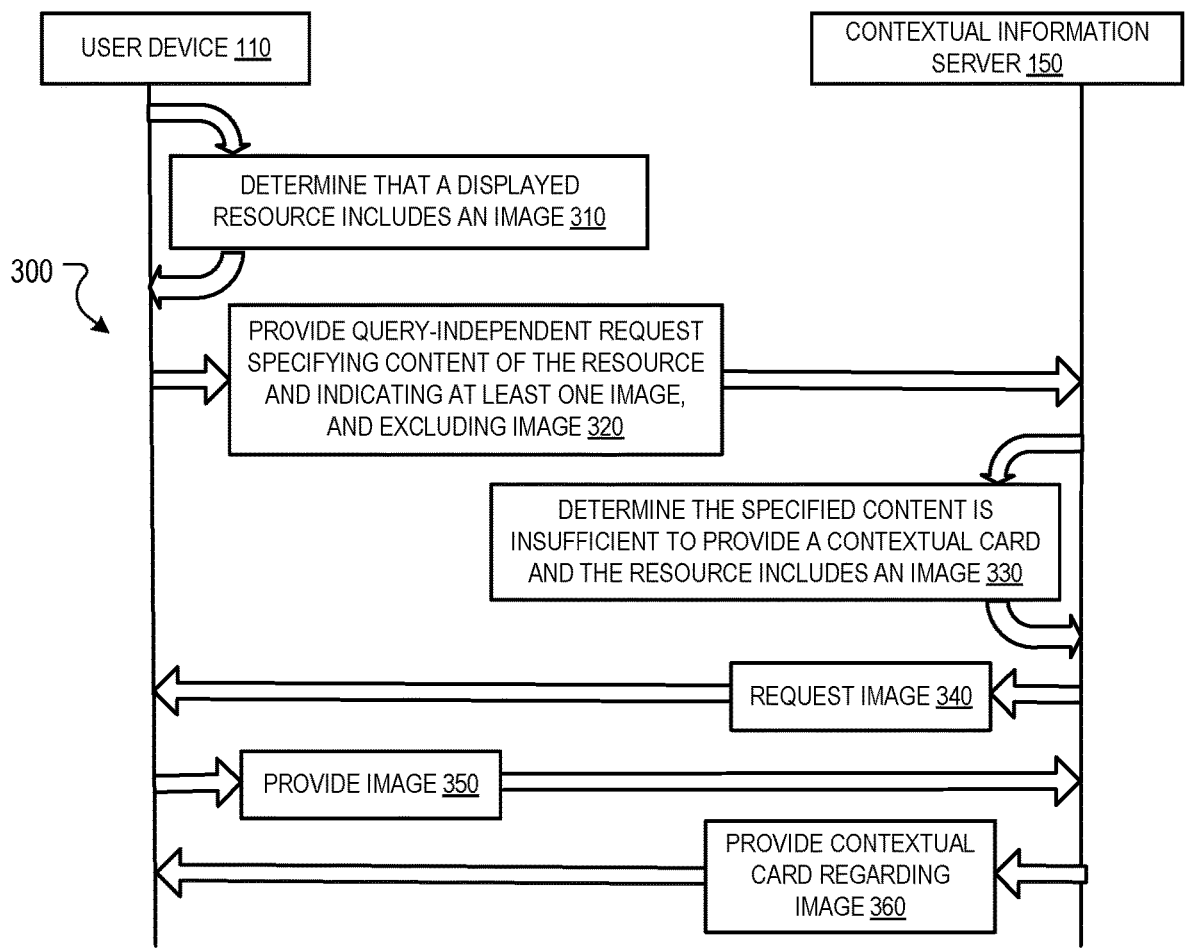
FIGS. 3A and 3B are interaction diagrams of example interactions for providing contextual information for a displayed resource that includes an image.

FIG. 3A is an interaction diagram of an example interaction 300 for providing contextual information for a displayed resource that includes an image. The interaction 300 is between the user device 110 and the contextual information server 150 when a displayed resource includes at least one image and textual content in the resource is insufficient to provide a contextual card. For example, a user is viewing a message conversation with the text "I took some amazing photos" input by the user and "Send me one," received from a recipient, followed by an image of the "Golden Gate Bridge." Here, the user desires to obtain contextual information about the "Golden Gate Bridge."

Initially, the interaction 300 includes determining that a displayed resource includes an image (310). For example, the user device 110 may determine that a user has long pressed a button and, in response, determine a portion of a resource that is currently being displayed includes the image, e.g., an image of the "Golden Gate Bridge," that includes more than five hundred pixels.

The interaction includes providing a query-independent request specifying content of the resource and indicating that at least one image is displayed, but excluding the image (320). For example, the user device 110 may provide a query-independent request specifying the text "I took some amazing photos" and "Send me one," and indicating that the displayed resource includes at least one image, but not include the image.

The interaction includes determining that the specified content is insufficient to provide a contextual card and the resource includes an image (330). For example, the contextual information server 150 may identify no search items from the textual content specified by the request or identify one or more search items from the textual content specified by the request but not select to provide contextual information about any of the identified search items, e.g., relevance scores for identified search items may indicate a degree of confidence of relevance that does not satisfy a relevance threshold.

The interaction includes requesting any displayed images in the resource (340). For example, the contextual information server 150 may provide the user device 110 a request for all images currently being displayed for the displayed resource.

The interaction includes providing any displayed images to the contextual information server 150 (350). For example, the user device 110 may provide the contextual information server 150 the image of the "Golden Gate Bridge" in the message conversation.

The interaction includes providing a contextual card regarding the image (360). For example, the contextual information server 150 may determine that the image of the "Golden Gate Bridge" is visually similar to an image that is stored as a representative image for the search item "Golden Gate Bridge" and, in response, provide the user device 110 a contextual card for the search item "Golden Gate Bridge."

Figure 3B:
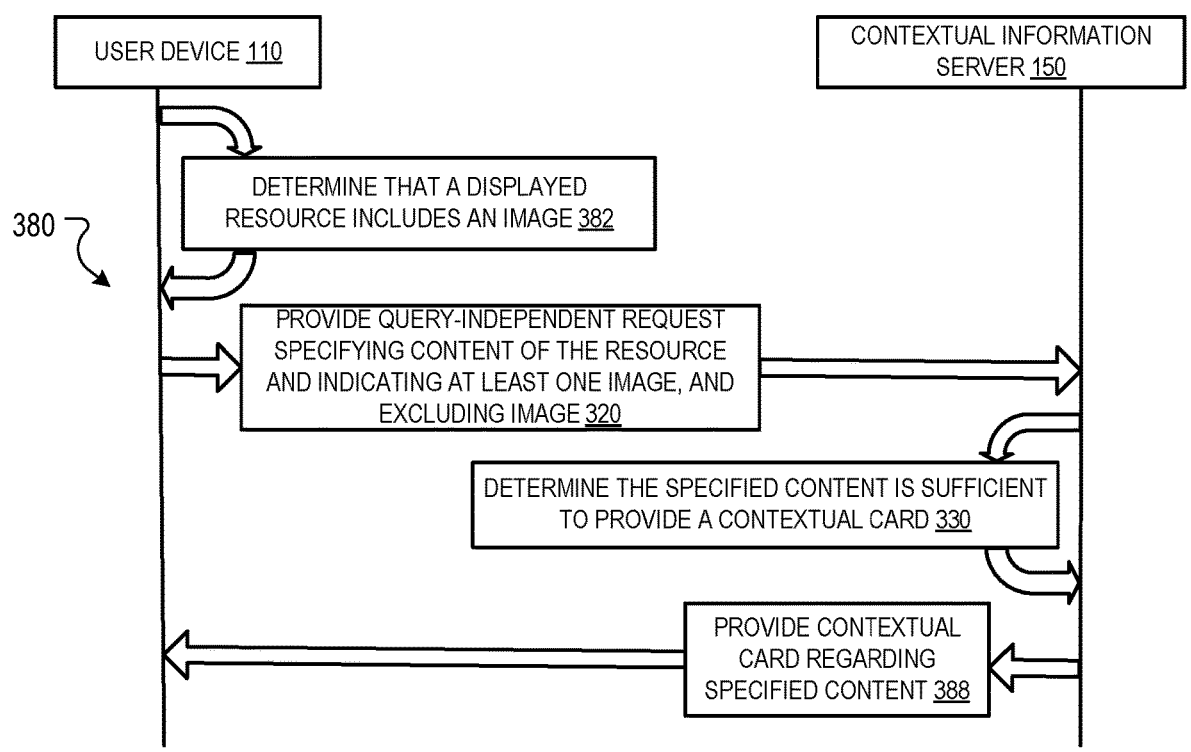

FIG. 3B is an interaction diagram of an example interaction 380 for providing contextual information for a displayed resource that includes an image. The interaction 380 is between the user device 110 and the contextual information server 150 when a displayed resource includes at least one image and textual content in the resource is sufficient to provide a contextual card. For example, a user is viewing a message conversation with the text "I took some amazing photos of the Golden Gate Bridge" and "Send me one," followed by an image of the "Golden Gate Bridge," where the user desires to obtain contextual information about the "Golden Gate Bridge."

Initially, the interaction 300 includes determining that a displayed resource includes an image (382). For example, the user device 110 may determine that a user has long pressed a button and that a portion of a resource that is currently being displayed includes the image, e.g., an image of the "Golden Gate Bridge," that includes more than five hundred pixels.

The interaction includes providing a query-independent request specifying content of the resource and indicating that at least one image is displayed, and excluding the image (384). For example, the user device 110 may provide a query-independent request specifying the text "I took some amazing photos of the Golden Gate Bridge" and "Send me one," and indicating that the displayed resource includes at least one image, but not including any images.

The interaction includes determining that the specified content is sufficient to provide a contextual card (386). For example, the contextual information server 150 may identify the search item "Golden Gate Bridge" from the text "Golden Gate Bridge" specified by the request and select the search item "Golden Gate Bridge" to provide a contextual card.

The interaction includes providing a contextual card regarding the specified content (388). For example, the contextual information server 150 may provide a contextual card for the search item "Golden Gate Bridge" identified from the text "Golden Gate Bridge" specified by the request without having the user device 110 provide any images currently being displayed.

Figure 4:
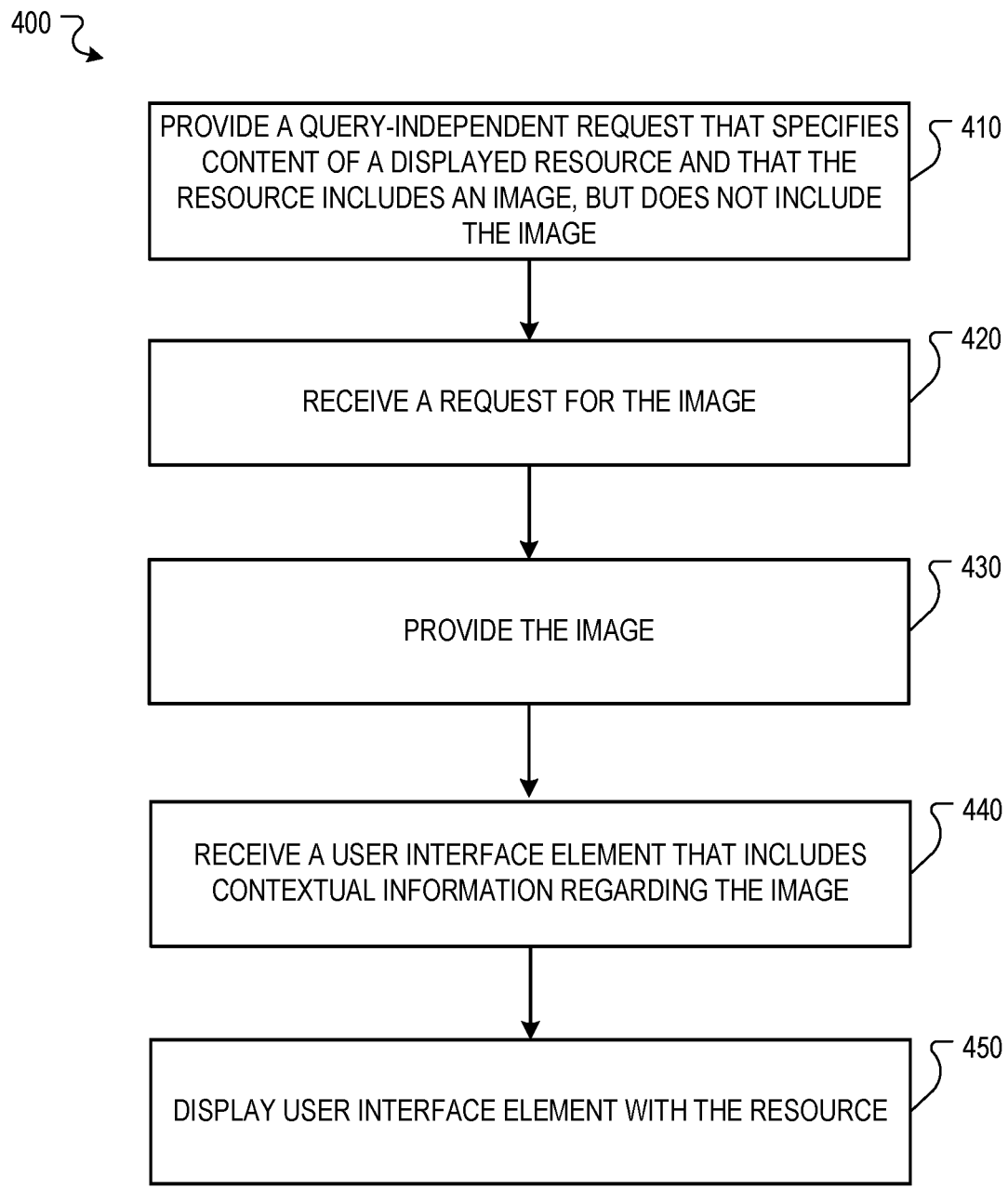
FIGS. 4 and 5 are flow diagrams of example processes for providing contextual information for a displayed resource that includes an image.

FIG. 4 is a flow diagram of a process 400 for a user device to provide contextual information for a displayed resource that includes an image. For example, the process 400 can be used by the user device 110 from the environment 100.

The process 400 includes providing a query-independent request that specifies content of a displayed resource and that the resource includes an image, but does not include the image (410). For example, the user device 110 may determine that a displayed portion of a webpage includes the text "is number four on our list of great burger spots" and includes an image, e.g., a logo of "Paul's Diner" and, in response, provide the contextual information server 150 a request that specifies the text "is number four on our list of great burger spots" and indicates that the request includes an image.

The process 400 includes receiving a request for the image (420). For example, the user device 110 may receive an image request from the contextual information server 150 in response to the contextual information server 150 determining that the textual content of the displayed resource specified by the request is insufficient to provide a user interface element including contextual information for the displayed resource, where the request is an instruction to the user device 110 to provide any displayed images to the contextual information server 150.

The process 400 includes providing the image (430). For example, in response to receiving the image request, the user device 110 may provide the contextual information server 150 an image of the logo of "Paul's Diner."

The process includes receiving a user interface element that includes contextual information regarding the image (440). For example, the user device 110 may receive a contextual card for "Paul's Diner" that includes contextual information regarding the logo of "Paul's Diner."

The process includes displaying a user interface element with the resource (450). For example, the user device 110 may display the contextual card for "Paul's Diner" overlaid on the displayed portion of the webpage that includes the text "is number four on our list of great burger spots" and includes the logo of "Paul's Diner."

In some implementations, the process 400 can include additional steps, fewer steps, or some of the steps can be divided into multiple steps. For example, the user device 110 may additionally perform functions of the contextual information server 150.

Figure 5:
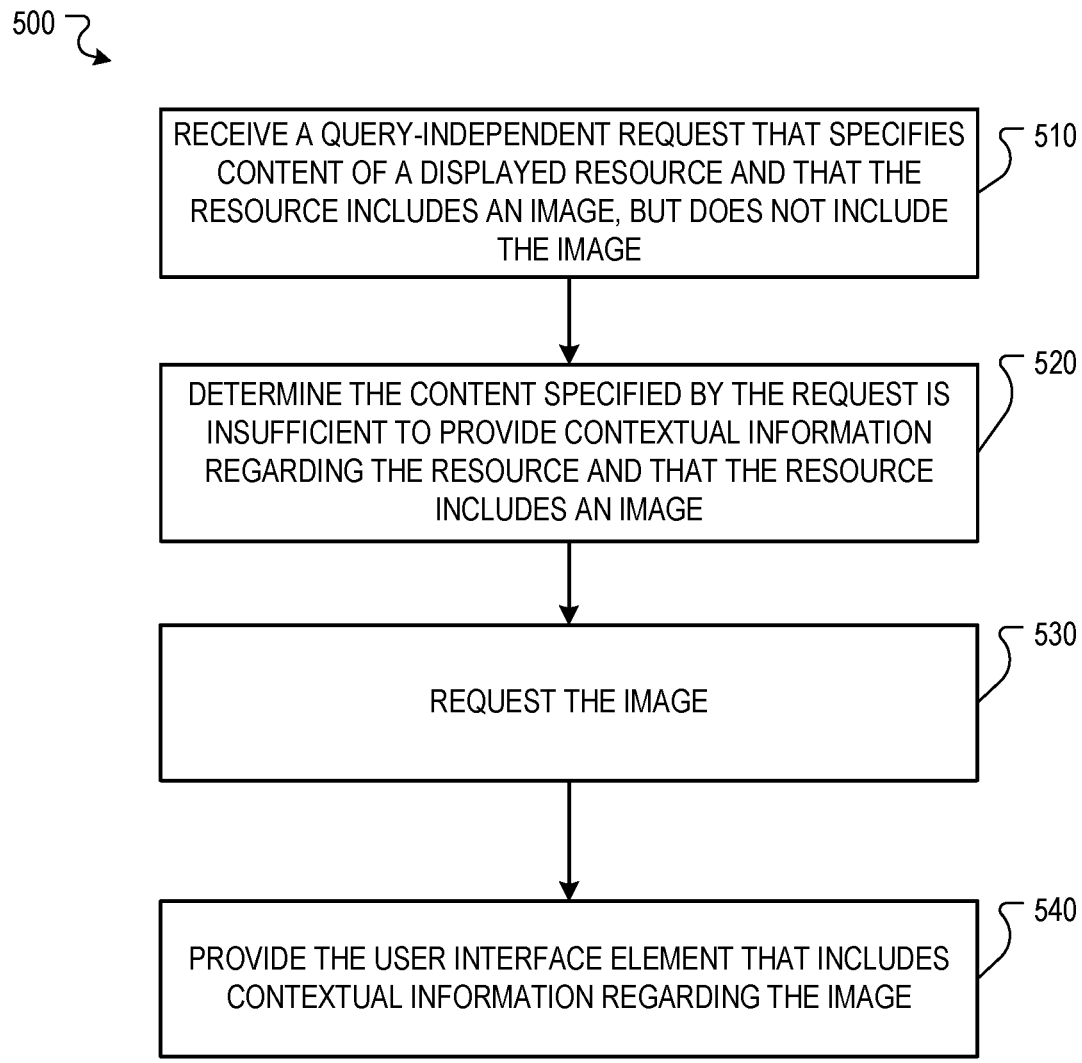

FIG. 5 is a flow diagram of a process 500 for a contextual information server to provide contextual information for a displayed resource that includes an image. For example, the process 500 can be used by the contextual information server 150 from the environment 100.

The process 500 includes receiving a query-independent request that specifies content of a displayed resource and that the resource includes an image, but does not include the image (510). For example, the contextual information server 150 may receive a request for contextual information for a displayed webpage where the request specifies textual content "is number four on our list of great burger spots" and indicates that the displayed resource includes at least one image.

The process 500 includes determining that the content specified by the request is insufficient to provide contextual information regarding the resource and that the resource includes an image (520). For example, the contextual information server 150 may determine that no search item can be identified by the displayed textual content "is number four on our list of great burger spots" specified by the request or that no search item identified from the textual content of the displayed resource has a relevance score that satisfies a relevance threshold.

The process 500 includes requesting the image in the displayed resource (530). For example, the contextual information server 150 may provide an image request to the user device 110 where the image request instructs the user device 110 to provide any displayed images from the webpage to the contextual information server 150.

The process 500 includes determining a user interface element that includes contextual information regarding the image (540). For example, the contextual information server 150 may receive an image that is the logo of "Paul's Diner," determine that the received image matches an image that is labeled as a logo of "Paul's Diner," identify the search item "Paul's Diner" based on the match, determine that the search item "Paul's Diner" has a relevance score that indicates a high degree of relevance based on that the image covers a large area of the screen, select the search item "Paul's Diner" to provide a user interface element based on the relevance score, and, in response, provide the user device 110 the user interface element for the search item "Paul's Diner." As discussed above, the user interface element for the search item "Paul's Diner" may be a contextual card for the restaurant "Paul's Diner" that includes information for the restaurant directly in the card, e.g., hours, number of rating stars, phone number, etc., or includes selectable options related to the restaurant, e.g., a selectable option for viewing directions to the restaurant in a map application, a selectable option for viewing hours that the restaurant is open, a selectable option for viewing reviews of the restaurant in a restaurant review application, or other selectable options.

In some implementations, the process 500 can include additional steps, fewer steps, or some of the steps can be divided into multiple steps. For example, the contextual information server 150 may additionally perform functions of the user device 110.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

Figure 6:
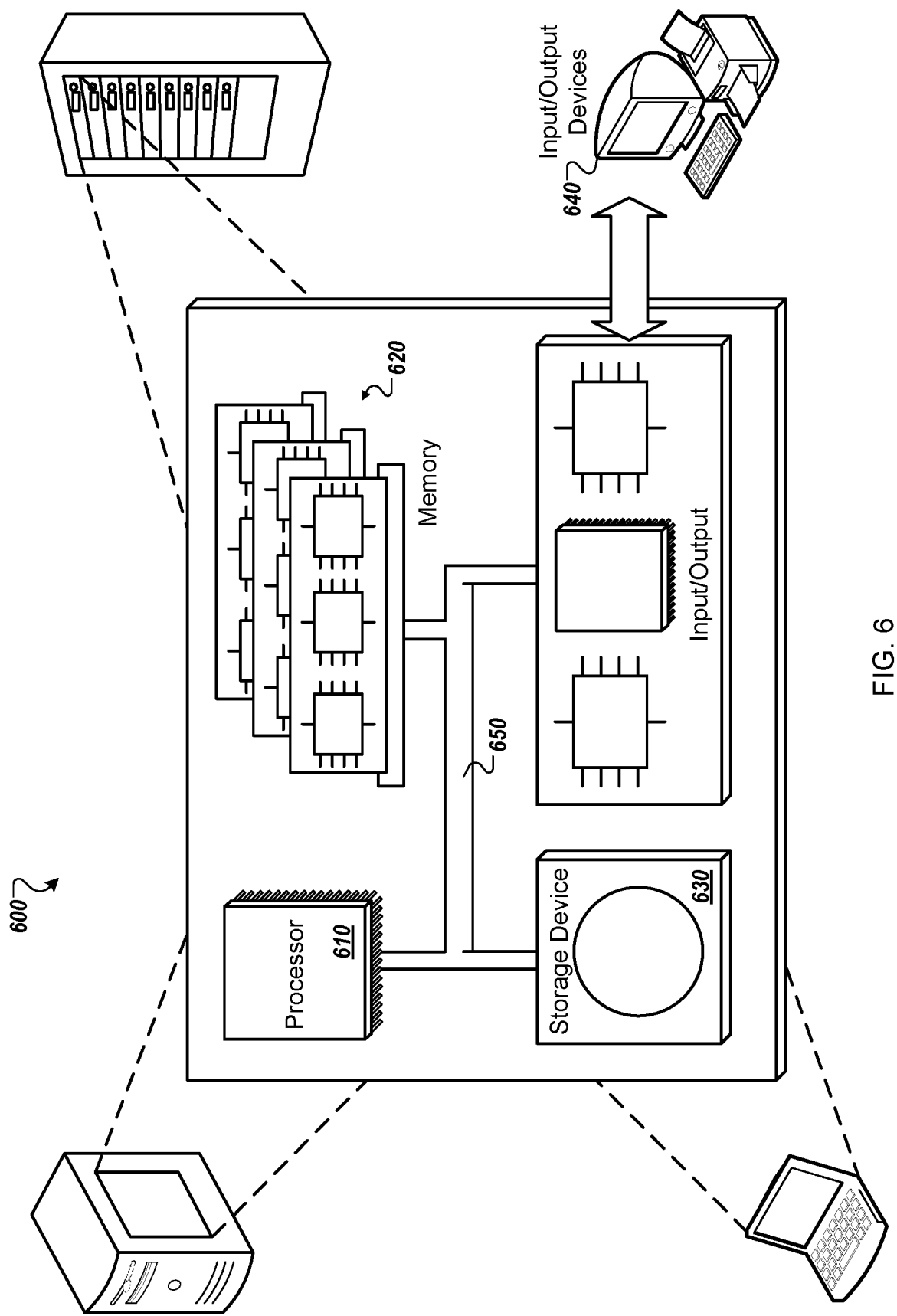
FIG. 6 is a schematic diagram of a computer system.

An example of one such type of computer is shown in FIG. 6, which shows a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a data processing apparatus, the method comprising:
   providing, by a user device to a contextual information server, a query-independent request from a user of the user device for contextual information relevant to an active resource displayed in an application environment on the user device, wherein the query-independent request specifies non-image content of the active resource and further specifies that the active resource displayed on the user device includes image content, but does not include the image content in the query-independent request;
   receiving, by the user device and from the contextual information server, an image request for the image content of the active resource, wherein the image request for the image content of the active resource is provided by the contextual information server to the user device in response to the contextual information server determining both that the query-independent request specifies that the active resource includes image content and relevance scores for search items identified from the non-image content of the query-independent request do not satisfy a relevance threshold to provide contextual information;
   in response to receiving the image request for the image content from the active resource from the contextual information server, providing, by the user device, the image content to the contextual information server;
   receiving, by the user device, a user interface element that includes contextual information regarding the image content of the active resource; and
   displaying, by the user device, the user interface element on the user device with the active resource.

2. The method of claim 1, wherein providing, by a user device to a contextual information server, a query-independent request for contextual information relevant to an active resource displayed in an application environment on the user device, wherein the query-independent request specifies non-image content of the active resource and further specifies that the active resource displayed on the user device includes image content, but does not include the image content in the request comprises:
   providing the query-independent request that does not include one or more query terms entered by a user and does not include the image content.

3. The method of claim 1, wherein providing, by a user device to a contextual information server, a query-independent request for contextual information relevant to an active resource displayed in an application environment on the user device, wherein the query-independent request specifies non-image content of the active resource and further specifies that the active resource displayed on the user device includes image content, but does not include the image content in the query-independent request comprises:
   providing the query-independent request that includes a data representation of the active resource displayed and does not include the image content.

4. The method of claim 1, wherein receiving, by the user device and from the contextual information server, the image request for the image content of the active resource comprises:
   receiving, by the user device, a request for all images currently displayed on the user device; and
   providing, by the user device, the image content to the contextual information server comprises providing, by the user device, all images currently being displayed on the user device to the contextual information server.

5. The method of claim 1, wherein in response to receiving the image request for the image content of the active resource from the contextual information server, providing, by the user device, the image content to the contextual information server comprises:
   providing a screenshot from the user device when multiple images are being displayed on the user device.

6. The method of claim 1, comprising:
   determining that a user desires contextual information relevant to the active resource; and
   in response to determining that the user desires contextual information relevant to the active resource, determining whether one or more images are currently being displayed,
   wherein providing, by the user device to the contextual information server, the query-independent request for contextual information relevant to the active resource displayed in the application environment on the user device is in response to determining that one or more images are currently being displayed.

7. The method of claim 6, wherein the determining whether one or more images are currently being displayed comprises:
   obtaining a screenshot from the user device; and
   identifying one or more rectangular portions of the screenshot that include non-textual content as the one or more images.

8. The method of claim 6, wherein the determining whether one or more images are currently being displayed is further in response to determining, by the user device, that the user device is using a metered network connection.

9. The method of claim 1, wherein the active resource displayed in the application environment on the user device comprises a web page, the non-image content includes text that is currently displayed on the user device and included in the web page, and the image content includes an image that is currently displayed on the user device and is included in the web page.

10. A system comprising:
    a data processing apparatus; and
    a non-transitory computer readable storage medium in data communication with the data processing apparatus and storing instructions executable by the data processing apparatus and upon such execution cause the data processing apparatus to perform operations comprising:

providing, by a user device to a contextual information server, a query-independent request from a user of the user device for contextual information relevant to an active resource displayed in an application environment on the user device, wherein the query-independent request specifies non-image content of the active resource and further specifies that the active resource displayed on the user device includes image content, but does not include the image content in the query-independent request;

receiving, by the user device and from the contextual information server, an image request for the image content of the active resource, wherein the image request for the image content of the active resource is provided by the contextual information server to the user device in response to the contextual information server determining both that the query-independent request specifies that the active resource includes image content and relevance scores for search items identified from the non-image content of the query-independent request do not satisfy a relevance threshold to provide contextual information;

in response to receiving the image request for the image content from the active resource from the contextual information server, providing, by the user device, the image content to the contextual information server;

receiving, by the user device, a user interface element that includes contextual information regarding the image content of the active resource; and displaying, by the user device, the user interface element on the user device with the active resource.

11. The system of claim 10, wherein providing, by a user device to a contextual information server, a query-independent request for contextual information relevant to an active resource displayed in an application environment on the user device, wherein the query-independent request specifies non-image content of the active resource and further specifies that the active resource displayed on the user device includes image content, but does not include the image content in the request comprises:

providing the query-independent request that does not include one or more query terms entered by a user and does not include the image content.

12. The system of claim 10, wherein providing, by a user device to a contextual information server, a query-independent request for contextual information relevant to an active resource displayed in an application environment on the user device, wherein the query-independent request specifies non-image content of the active resource and further specifies that the active resource displayed on the user device includes image content, but does not include the image content in the request comprises:

providing the query-independent request that includes a data representation of the active resource displayed and does not include the image content.

13. The system of claim 10, wherein receiving, by the user device and from the contextual information server, the image request for the image content of the active resource comprises:

receiving, by the user device, a request for all images currently displayed on the user device; and providing, by the user device, the image content to the contextual information server comprises providing, by the user device, all images currently being displayed on the user device to the contextual information server.

14. The system of claim 10, wherein in response to receiving the image request for the image content of the active resource from the contextual information server, providing, by the user device, the image content to the contextual information server comprises:

providing a screenshot from the user device when multiple images are being displayed on the user device.

15. The system of claim 10, the operations comprise:

determining that a user desires contextual information relevant to the active resource; and in response to determining that the user desires contextual information relevant to the active resource, determining whether one or more images are currently being displayed, wherein providing, by the user device to the contextual information server, the query-independent request for contextual information relevant to the active resource displayed in the application environment on the user device is in response to determining that one or more images are currently being displayed.

16. The system of claim 15, wherein the determining whether one or more images are currently being displayed comprises:

obtaining a screenshot from the user device; and identifying one or more rectangular portions of the screenshot that include non-textual content as the one or more images.

17. The system of claim 15, wherein the determining whether one or more images are currently being displayed is further in response to determining, by the user device, that the user device is using a metered network connection.

18. A non-transitory computer-readable medium storing software comprising instructions executable by one or more computers which, upon such execution, cause the one or more computers to perform operations comprising:

providing, by a user device to a contextual information server, a query-independent request from a user of the user device for contextual information relevant to an active resource displayed in an application environment on the user device, wherein the query-independent request specifies non-image content of the active resource and further specifies that the active resource displayed on the user device includes image content, but does not include the image content in the query-independent request;

receiving, by the user device and from the contextual information server, an image request for the image content of the active resource, wherein the image request for the image content of the active resource is provided by the contextual information server to the user device in response to the contextual information server determining both that the query-independent request specifies that the active resource includes image content and relevance scores for search items identified from the non-image content of the query-independent request do not satisfy a relevance threshold to provide contextual information;

in response to receiving the image request for the image content from the active resource from the contextual information server, providing, by the user device, the image content to the contextual information server;

receiving, by the user device, a user interface element that includes contextual information regarding the image content of the active resource; and displaying, by the user device, the user interface element on the user device with the active resource.

19. The medium of claim 18, wherein providing, by a user device to a contextual information server, a query-independent request for contextual information relevant to an active resource displayed in an application environment on the user device, wherein the query-independent request specifies non-image content of the active resource and further specifies that the active resource displayed on the user device includes image content, but does not include the image content in the request comprises:

providing the query-independent request that does not include one or more query terms entered by a user and does not include the image content.

20. The medium of claim 18, wherein providing, by a user device to a contextual information server, a query-independent request for contextual information relevant to an active resource displayed in an application environment on the user device, wherein the query-independent request specifies non-image content of the active resource and further specifies that the active resource displayed on the user device includes image content, but does not include the image content in the request comprises:

providing the query-independent request that includes a data representation of the active resource displayed and does not include the image content.

\* \* \* \* \*